(12) United States Patent
Lohrbach

(10) Patent No.: US 8,060,120 B2
(45) Date of Patent: Nov. 15, 2011

(54) SYSTEM AND METHOD FOR TRANSMITTING A SEQUENCE OF PAGES IN A COMMUNICATION SYSTEM

(75) Inventor: Jeffrey G. Lohrbach, Elgin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1057 days.

(21) Appl. No.: 11/619,238

(22) Filed: Jan. 3, 2007

(65) Prior Publication Data
US 2008/0161021 A1    Jul. 3, 2008

(51) Int. Cl.
*H04W 68/00* (2009.01)
(52) U.S. Cl. .......................................... 455/458; 379/57
(58) Field of Classification Search ................. 455/458, 455/422.1, 432.1, 456.1
See application file for complete search history.

(56) References Cited

U.S. PATENT DOCUMENTS

| | | | | |
|---|---|---|---|---|
| 4,876,538 A * | 10/1989 | Andros et al. | ............... | 340/7.27 |
| 4,878,051 A * | 10/1989 | Andros et al. | ........... | 340/825.44 |
| 4,881,073 A * | 11/1989 | Andros et al. | ........... | 340/825.44 |
| 5,153,802 A * | 10/1992 | Mertz et al. | ..................... | 361/18 |
| 5,153,902 A * | 10/1992 | Buhl et al. | ................. | 455/432.1 |
| 5,278,890 A * | 1/1994 | Beeson et al. | ................... | 379/57 |
| 5,511,110 A * | 4/1996 | Drucker | ........................ | 455/458 |
| 5,559,859 A * | 9/1996 | Dai et al. | ...................... | 455/459 |
| 7,120,453 B2 * | 10/2006 | La Porta et al. | ............... | 455/458 |
| 2004/0001580 A1 * | 1/2004 | Mason | ..................... | 379/207.04 |
| 2005/0094667 A1 * | 5/2005 | Dahlman et al. | ............. | 370/473 |
| 2006/0270422 A1 * | 11/2006 | Benco et al. | ................. | 455/458 |
| 2007/0207785 A1 * | 9/2007 | Chatterjee et al. | | |

* cited by examiner

*Primary Examiner* — Kent Chang
*Assistant Examiner* — Dinh Nguyen
(74) *Attorney, Agent, or Firm* — Terri S. Hughes; Valerie M. Davis

(57) ABSTRACT

A system and method for transmitting a series of pages in a communication system. The system includes a paging console for placing a plurality of pages in a queue for transmission to one or more targets devices. Each page includes a Dependent-Upon (DU) field that indicates whether the page is dependent upon an earlier page in the queue. Upon initiating a paging event, the plurality of pages are attempted based upon their order in the queue. Prior to transmitting each page, it is determined whether the DU field of that page indicates a dependency upon an earlier page. If there is no dependency, the page is attempted as normal. If the current page is dependent upon an earlier page, a record is checked to determine whether the earlier page was successful. If the earlier page was successful, the current page is attempted. If the earlier page was unsuccessful, the current page is not attempted and is recorded as unsuccessful.

19 Claims, 4 Drawing Sheets

SYSTEM AND METHOD FOR TRANSMITTING A SEQUENCE OF PAGES IN A COMMUNICATION SYSTEM

TECHNICAL FIELD OF THE DISCLOSURE

This disclosure relates generally to communication systems, and more particularly, to a system and method for transmitting a sequence of pages in a communication system.

BACKGROUND OF THE DISCLOSURE

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of communication resources are allocated amongst multiple users or groups by assigning the base sites within a coverage area on a call-by-call basis, or as conventional (non-trunked) systems where communication resources are dedicated to one or more users or groups. In trunked systems, or in mixed trunked and conventional systems, there is usually provided a central controller/server (sometimes called a "zone controller") for allocating communication resources among a group of sites. The zone controller may reside within a single device or multiple devices and may be located at a fixed equipment site or may be distributed among the base sites.

Paging is typically used in communication systems to convey an alarm or signal to users of communication units, or to send control messages to specialized hardware (e.g., turn on fire siren, open a gate, etc.). In general, there are two types of pages: tone pages and system pages. Tone pages comprise a series of analog tone(s) and are traditionally sent over conventional analog resources. System pages (such as call alert messages), on the other hand, do not involve tones and, instead, use digital signaling methods to send alert messages to a target over trunking and conventional digital resources.

Oftentimes, users, such as dispatch operators, organize a group of pages in order to transmit the pages in a particular sequence. For example, a particular paging sequence may be used to ensure that one person, such as a police chief or other high-ranking official, is paged before others. In another example, a particular paging sequence may also be used when controlling a mechanical device to ensure that the device operates in a predetermined way.

However, in traditional paging operations, grouping pages in a particular sequence does not ensure that an earlier page is actually successfully transmitted before the subsequent pages. Particularly, if an earlier attempted page fails (due to a paged-upon resource being unavailable, a target not receiving the page, or the like), subsequent pages continue to be transmitted regardless of the prior page failure. As a result, in traditional paging systems, there is no way to ensure that a subsequent page is transmitted only after the successful transmission of an earlier page.

Accordingly, there is a need for a system and method for linking one or more pages so that transmission of a subsequent page is attempted only upon the successful transmission of an earlier page.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for transmitting a series of pages in a communication system. At a paging console, a plurality of pages are placed in a queue for transmission to one or more targets devices. Upon initiating a paging event, the plurality of pages are attempted based upon their order in the queue. A transmission record is also kept to indicate whether each attempted page was successfully transmitted.

In accordance with the present disclosure, each page includes a Dependent-Upon (DU) field that indicates whether the page is dependent upon an earlier page in the queue. Prior to transmitting each page, it is determined whether the DU field of that page indicates a dependency upon an earlier page. If there is no dependency, the page is attempted as normal. If, however, the current page is dependent upon an earlier page, the record is checked to determine whether the earlier page was successful. If the earlier page was successful, the current page is attempted. If the earlier page was unsuccessful, the current page is not attempted and is recorded as unsuccessful.

Figure 1:
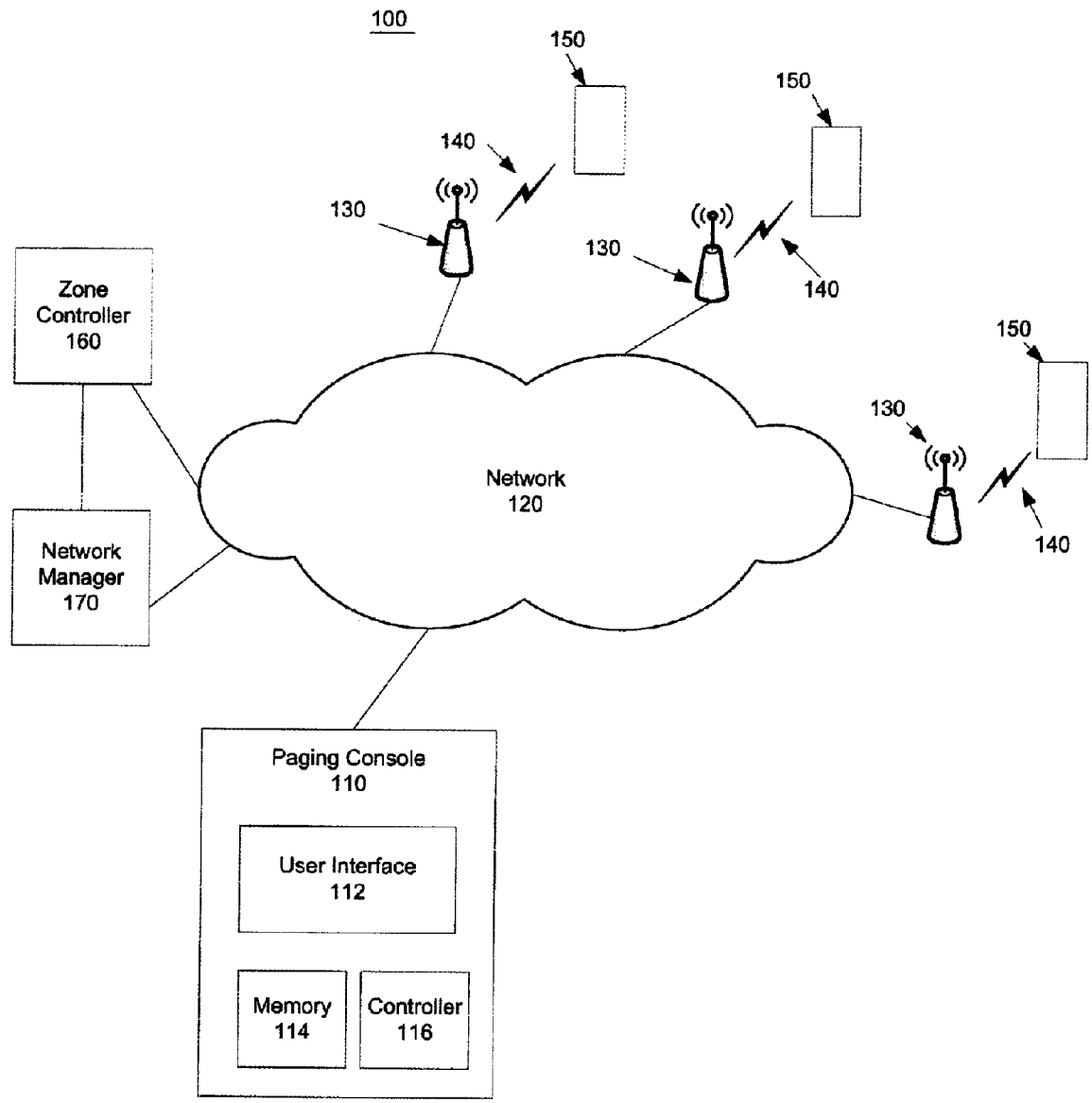
FIG. 1 shows one embodiment of a paging system according to the present disclosure.

Let us now discuss the present disclosure in greater detail by referring to the figures below. FIG. 1 shows one embodiment of a paging system 100 according to the present disclosure. The system 100 comprises a paging console 110 coupled to a network 120. The paging console 110 may include a user interface 112, a memory 114, and a controller 116 (which may be a digital signaling processor, a microprocessor, or the like). As will be discussed in more detail below, the paging console 110 is configured to allow a user, such a dispatcher, to select and prepare pages that are to be sent to one or more target devices 150 in a particular sequence. For purposes of this disclosure, the term "page" may include any type of page, such as a tone page (i.e., an analog page comprising a series of tones), a system page (i.e. digital pages used to send call alert messages), or the like.

The network 120 is further coupled to a plurality of base stations 130. Each base station 130 is configured to communicate, using one or more wireless resources 140, with one or more target devices 150 within a specific coverage area. For example, each base station 130 may be configured to communicate with target devices 150 using conventional (i.e., non-trunked) analog resources, conventional digital resources, trunked resources (such as trunked talkgroups or trunked private calls), or any combination thereof. The target devices 150 may include communication units (such as pagers, mobile or portable wireless radio units, cellular radio/telephones, video terminals, portable computers with wireless modems, etc.) mechanical devices (such as sirens, gates, etc.) or any other devices capable of receiving a wireless page.

As shown in FIG. 1 the network 120 is also coupled to a zone controller 160. The zone controller 160 manages and assigns Internet Protocol (IP) multicast addresses for communications between and among the various base stations 130 and is also responsible for the assignment of communication channels and resources. The zone controller 160 may also be configured to process system page requests from the paging console 110.

The system 100 also includes a network manager 170 that is coupled to the network 120 and the zone controller 160. The network manager 170 may be configured to maintain information regarding page format definitions, preconfigured pages, and preconfigured groupings of pages that may be accessible to the paging console. In one embodiment, the paging console 110, the network 120, the base stations 130, the zone controller 160 and the dispatch site 170 may be coupled using T1 lines, E1 lines, fiber optic lines, wireless links, Ethernet links, or any other suitable means for transporting data between the various components.

Practitioners skilled in the art will also appreciate that the system 100 may also include various other elements not shown in FIG. 1. For example, although one paging console and three base stations are illustrated, the system 100 may include any number of paging consoles and base stations. The system 100 may also be linked to a public switched telephone network (PSTN), a facsimile machine, or the like. The system 100 may also be connected to a number of additional content sources, such as the Internet or various Intranets.

In practice, a user, via the user interface 112 of the paging console 110, creates a sequence of pages that are to be broadcast using one or more wireless resources 140 (e.g., conventional digital resources, conventional analog resources, or trunking resources). The selected pages are collected and stored in a page queue until a "Send Page" function is invoked. Once the "Send Page" function is invoked, transmission of the pages stored in the queue is attempted.

For tone pages, the paging console 110 generates a series of tones that are sent to one or more base stations 130 via the network 120. The tone page is then broadcast by the base stations 130 to one or more target devices 150 using trunking or conventional analog resources. For system pages, the paging console 110 sends a system page request to the zone controller 160, which then generates the system page and transmits it to one or more base stations 130 via the network 120. The system page is then broadcast to one or more target devices 150 using trunking or conventional digital resources. Each target device 150 receiving a system page may also be configured to send a communication back to the base station 130 upon receiving a system page in order to acknowledge receipt of the system page. The specific construction of both tone pages and system pages is well known and is therefore not discussed in any more detail herein.

Depending on the configuration of the paging console 110 and/or a selection of the user, the pages may also be attempted either sequentially or simultaneously. As would be understood by one skilled in the art, in a sequential paging mode, the paging console 110 sends the pages one-at-a-time, and in the order in which they are placed in the page queue. In the sequential paging mode, the paging console 110 also waits for a prior page attempt to be resolved before attempting the next page in the queue. As will be explained in more detail below, a page is considered resolved once the success or failure of the page has been determined.

In a simultaneous paging mode, on the other hand, the paging console 110 sends the pages simultaneously on multiple wireless resources 140. Pages on the same wireless resource 140 are then sent sequentially in the order in which they are placed in the page queue. Unlike the sequential paging mode, the paging console 110 generally does not wait for system pages to be resolved before attempting a subsequent page in the simultaneous paging mode.

Figure 2:
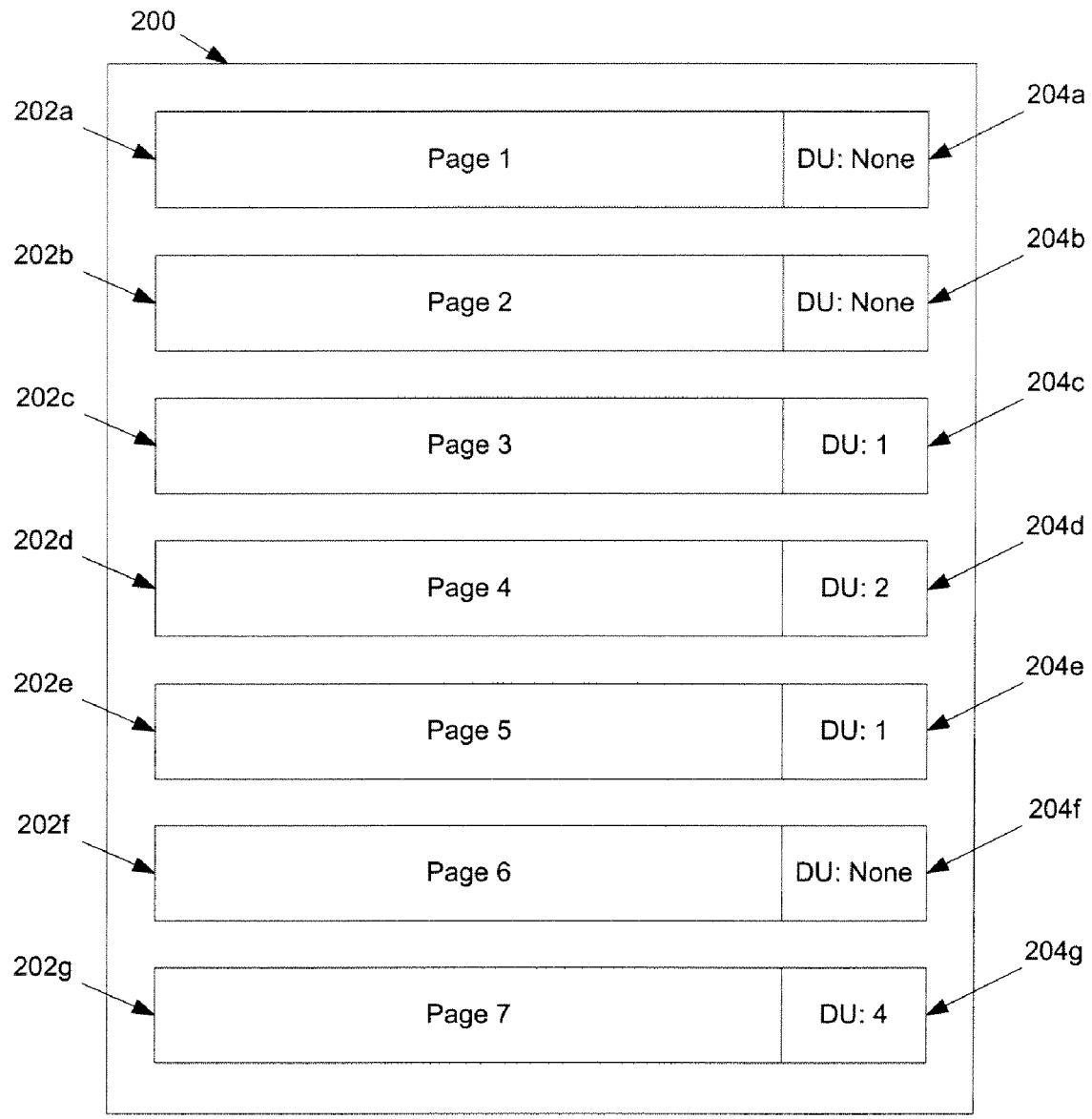
FIG. 2 shows one embodiment of a page queue having a plurality of pages according to the present disclosure.

FIG. 2 illustrates one embodiment of a page queue 200 containing a group of pages 202a-202g. For exemplary purposes, seven pages are illustrated, although it is understood that any number of pages may be included in the page queue 200.

In accordance with the present disclosure, each page 202a-202g includes a Dependent-Upon (DU) field 204a-204g, respectively. The DU field 204 indicates whether transmission of a page is dependent upon the successful transmission of a previous page in the queue. In one embodiment, a previous page may be identified in the DU field 204 using a page alias or other identifier. In this way, a dependency on another page may be created regardless of the position of the prior page in the page queue. Alternatively, a previous page may also be identified in the DU field 204 by indicating a position in this page queue, thus allowing for a dependency to be created based on a previous position within the page queue regardless of what page is in that position. In the example illustrated in FIG. 2, pages 3 and 5 are dependent upon the successful transmission of page 1. Page 7 is dependent upon the successful transmission of page 4, which is in turn dependent upon the successful transmission of page 2. Pages 1, 2, and 6, on the other hand, are not dependent upon any other pages.

Although not illustrated for the sake of clarity, each page 202a-202g may also include other page data, such as the page format, the page digits, the paged-upon resource identifier, and, if applicable, the paged-upon resource frequency. The purpose and configuration of such page data is well known in the art and is therefore not discussed in any more detail herein.

Figure 3:
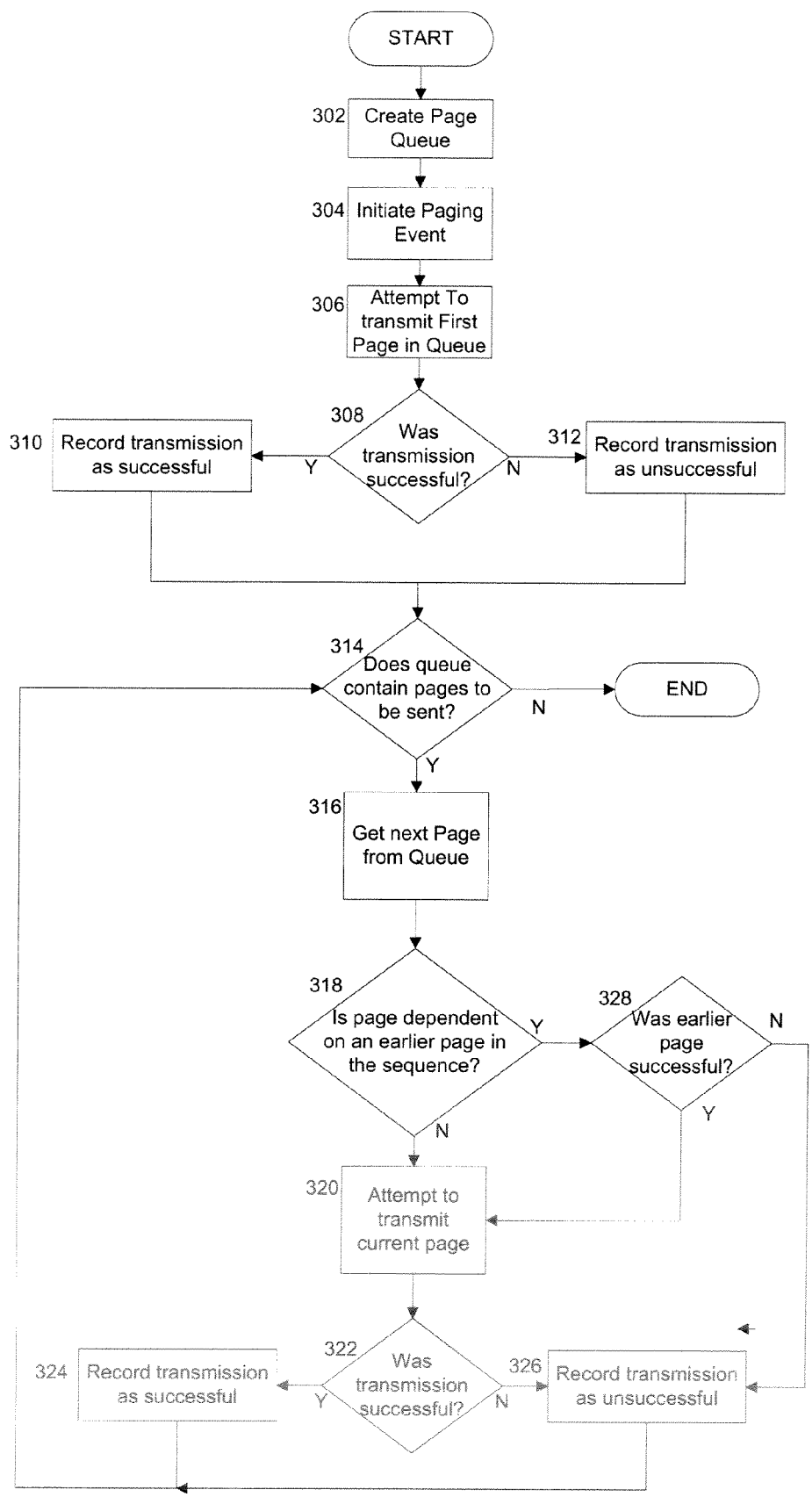
FIG. 3 shows one embodiment of a method for transmitting a plurality of pages in a sequential operation mode according the present disclosure.

One exemplary method for transmitting a plurality of pages in a sequential paging mode according to the present disclosure is illustrated in FIG. 3. In step 302, a page queue having a plurality of pages is created at a paging console 110. The page queue may comprise manually configured pages or preconfigured pages. As would be understood by one skilled in the art, manually configured pages are individual pages that are constructed by the user of the paging console 110 in an ad hoc manner via the user interface 112. Preconfigured pages, on the other hand, are pages that have been previously configured in the network manager 170, assigned a particular page alias, and made accessible to the user of the paging console. The preconfigured pages may be originally configured by the user of a paging console 110, a network administrator, or any other individual. Preconfigured pages may also be grouped in a predetermined order and stored as preconfigured group pages under a single alias. This allows a predetermined group of pages to be easily added to the page queue in the predetermined order.

In step 304, a paging event is initiated to begin transmitting the pages in the page queue. The paging event may be started, for example, by a user invoking a "Send Page" function on the paging console 110. Transmission of the first page in the queue is attempted in step 306. In step 308, it is determined whether transmission of the first page was successful. For example, a system page (such as a call alert page) may be considered successful if it was acknowledged by a target device 150 within a predetermined amount of time after the system page being sent. Tone pages, on the other hand, are generally not acknowledged by a target device 150. Thus, in one embodiment, tone pages may be considered successful so long as the tone page was actually transmitted on the identified paged-upon resource (i.e., the paged-upon resource was not busy with a higher-priority communication or otherwise unavailable at the time the page was attempted). Of course, any other criteria for determining whether a particular page was successful may also be used.

If transmission of the page was successful, the successful transmission is noted in a transmission record in step 310. The transmission record is used to maintain a record of whether each page attempt from the page queue was a success or failure. In one embodiment, the transmission record is stored by the memory 114 of the paging console 110. However, the transmission record may also be stored on the zone controller 160, the network manager 170, or any other device within the system 100. If transmission of the page was unsuccessful, the failure is noted in the transmission record in step 312.

Whether or not the first page was successful, the process proceeds to step 314. In step 314, the paging console 110, and more particularly the controller 116, determines whether the queue 200 contains any more pages to be sent. If there are more pages to be sent in the queue 200, the next page is obtained in step 316. If there are no more pages in the queue 200, then the process ends.

In step 318, the controller 116 determines whether the DU field 204 of the current page indicates that it is dependent upon an earlier page in the queue 200. If the current page is not dependent upon an earlier page in the queue 200, the current page is attempted in step 320, and the process proceeds to step 322.

In step 322, the controller 116 determines whether the current page was successful. This is accomplished using a similar approach as described above for step 308. Of course, the criteria for determining whether the current page is successful may or may not be the same as the criteria used for a previous page. If the current page was successful, the transmission record is updated to indicate successful transmission of the page in step 324. It the current page was unsuccessful, the transmission record is updated to indicate that the page failed in step 326.

Referring back to step 318, if the current page is dependent upon an earlier page in the queue 200, the process proceeds to step 328. In step 328, it is determined whether the earlier page was successful by referencing the transmission record. If the earlier page was recorded as successful, the process proceeds to step 320 and the current page is attempted. If the earlier page is recorded as a failure, the current page is not attempted and is also recorded as a failure in step 326. The process then returns back to step 314 where it is determined if there are any more pages to be sent in the queue 200.

Figure 4:
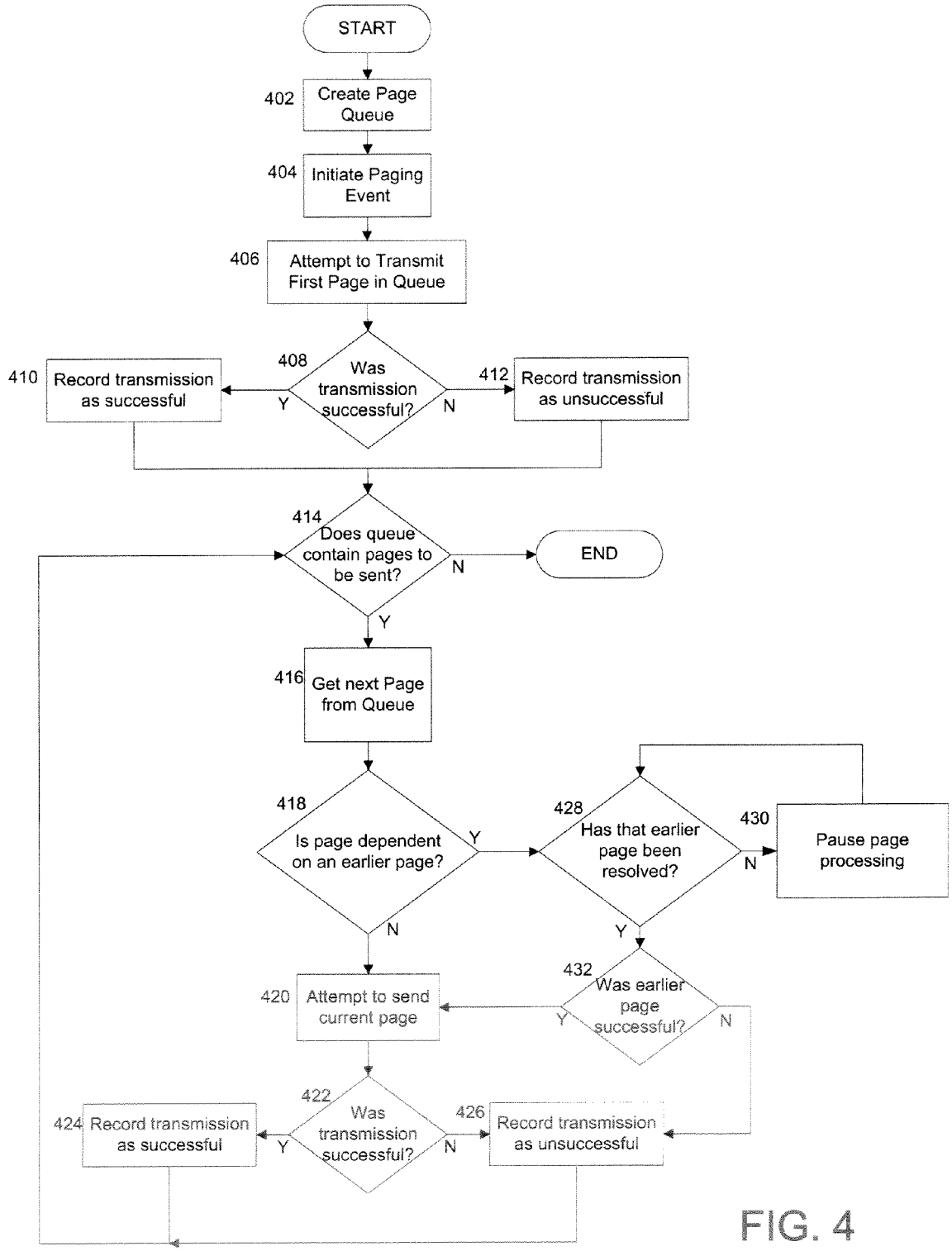
FIG. 4 shows one embodiment of a method for transmitting a plurality of pages in a simultaneous operation mode according the present disclosure.

Turning to FIG. 4, one exemplary embodiment of a method for transmitting a plurality of pages in a simultaneous paging mode is illustrated. A page queue 200 having a plurality of pages is created in step 402. In step 404, a paging event is initiated to begin transmitting the plurality of pages in a simultaneous paging mode. As noted above, in a simultaneous paging mode, pages on different wireless resources are attempted in parallel while pages on the same wireless resource are attempted sequentially based on the order in which they are placed in the page queue 200. For purposes of this disclosure, it should therefore be understood the following described steps 406 through 430 are performed independently for each wireless resource on which the pages in the page queue are being attempted.

A first page in the page queue 200 is attempted in step 406. In step 408, it is determined whether transmission of the page was successful. If transmission of the page was successful, the successful transmission is noted in a transmission record in step 410. If transmission of the page was unsuccessful, the failure is noted in the transmission record in step 412.

In step 414, it is determined whether the queue 200 contains any more pages to be sent. If there are more pages to be sent in the queue 200, a next page is obtained in step 416. If there are no more pages in the queue 200, then the process ends.

In step 418, it is determined whether the DU field 204 of the current page indicates that it is dependent upon an earlier page in the queue 200. As noted above, when operating in the simultaneous paging mode, pages transmitted on different wireless resources are not necessarily attempted in the same order as the sequence set out in the page queue 200. This is because pages may have different formats, different lengths, different tone durations, etc., and therefore different pages take up varying amounts of transmit time. As a result, a page may be attempted on one wireless resource before the page upon which it depends is attempted on another wireless resource.

Accordingly, in one embodiment, the paging console 110 may be configured to ignore any dependency unless the dependent-upon earlier page identified in the DU field 204 was attempted on the same wireless resource as the current page. This ensures that a dependency is only analyzed if it is certain that the dependent-upon page was attempted before the current page. Alternatively, the paging console 110 may also be configured to ignore any dependencies if a success or failure has not yet been recorded for the dependent-upon page identified in the DU field 204.

If the current page is not dependent upon an earlier page, the current page is attempted in step 420, and it is determined whether the current page was successful in step 422. If the current page was successful, the transmission record is updated to indicate successful transmission of the page in step 424. It the current page was unsuccessful, the transmission record is updated to indicate that the page failed in step 426.

Referring back to step 418, if the current page is dependent upon an earlier page (which is either on the same resource or known to have been already attempted), the process proceeds to step 428. In step 428, it is determined whether the earlier page, upon which the current page depends, has been resolved. In one embodiment, an earlier page may be considered to have been resolved if it has been determined whether that earlier page attempt was a success or a failure. For example, as discussed above, the success or failure of a system page is generally not determined until either an acknowledgement is received from a target device 150 (indicating a success) or a predetermined time has elapsed without receiving an acknowledgement (indicating a failure). Thus, a system page may be considered resolved once either an acknowledgement is received or the predetermined amount of time has elapsed. Of course, it should be understood that a system page may also be considered as failed, and thus resolved, if a request for that system page is rejected by the zone controller 160. This may occur, for example, if the target device 150 for the system page is not affiliated with the system 100 at the time the system page request is made. Tone pages, on the other hand, may be considered resolved once they are attempted.

If the earlier page has not been resolved, page processing is paused in step 430, and the process returns to step 428. Once the earlier page has been resolved, the process proceeds to step 432. In step 432, it is determined whether the earlier page was successful by referencing the transmission record. If the earlier page was successful, the process proceeds to step 420 and the current page is attempted. If the earlier page is unsuccessful, then the current page is not attempted and is automatically considered as a failure in step 426. The process then returns back to step 414 where it is determined if there are any more pages to be sent in the queue 200.

By means of the aforementioned disclosure, a system and method is provided for linking various pages in a page queue 200 such that certain pages are attempted only upon successful transmission of certain earlier pages. As a result, a dispatcher or other user of a paging console can ensure that pages are delivered to their targets in a predetermined order.

Further advantages and modifications of the above described system and method will readily occur to those skilled in the art. For example, although each page is described above as being dependent upon one earlier page in the page queue, it should be understood that each page may also be dependent on two or more earlier pages. It should also be understood that the present disclosure may be used for any type of page format and any type of paging system. One skilled in the art would also understand that although many of the steps above are described as being performed by a controller at the paging console where the page queue was generated, the steps may also be performed by other components in the system such as the zone controller, network manager, or even a different paging console.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting a plurality of pages arranged in a page queue in a sequence, the method comprising:
   initiating a paging event to begin transmitting the plurality of pages based on the sequence of the plurality of pages in the page queue;
   obtaining a page from the page queue;
   determining from an indication in a dependent-upon field in the page that the page is dependent upon a successful transmission of an earlier page in the page queue;
   determining whether transmission of the earlier page was successful; and
   attempting to transmit the page only if transmission of the earlier page was successful.

2. The method of claim 1 wherein each of the plurality of pages may be one of a tone page or a system page.

3. The method of claim 2 wherein determining whether the earlier page was successfully transmitted includes accessing a transmission record maintained for the page queue.

4. The method of claim 1 wherein, upon initiating the paging event, the plurality of pages are transmitted in a sequential paging mode.

5. The method of claim 1 wherein, upon initiating the paging event, the plurality of pages are transmitted in a simultaneous paging mode.

6. The method of claim 5 wherein determining from the dependent-upon field in the page that the page is dependent upon the successful transmission of an earlier page includes determining that the page is dependent upon the successful transmission of an earlier page on the same resource.

7. The method of claim 5 further including, prior to determining whether the earlier page was successful, determining whether the earlier page was resolved, and pausing processing of the page until the earlier page has been resolved.

8. A method for transmitting a plurality of pages arranged in a page queue in a sequence, the method comprising:
   initiating a paging event to begin transmitting the plurality of pages based on the sequence of the plurality of pages in the page queue;
   obtaining a first page from the page queue;
   attempting to transmit the first page;
   determining whether the first page was transmitted successfully;
   obtaining a second page from the page queue, and determining from an indication in a dependent-upon field in the second page that the second page is dependent upon the successful transmission of the first page; and
   attempting transmission of the second page only if transmission of the first page was successful.

9. The method of claim 8 further including recording whether the first page was transmitted successfully in a transmission record.

10. The method of claim 9 further including recording, in the transmission record, that transmission of the second page was unsuccessful if the second page is not attempted due to the first page being unsuccessful.

11. The method of claim 8 wherein the first page is a tone page and wherein determining whether the first page was transmitted successfully includes determining whether the tone page was successfully sent on a paged-upon resource.

12. The method of claim 8 wherein the first page is a system page and wherein determining whether the first page was transmitted successfully includes determining whether an acknowledgement of the system page was received from a target device to which the system page was directed.

13. The method of claim 8 wherein the page queue may be comprised of at least one of a manually created page, a preconfigured page, and a preconfigured group of pages.

14. A paging system comprising:
   a user interface configured to allow a user to create a page queue having a plurality of pages ordered in a given sequence, wherein each of the plurality of pages includes a dependent-upon field that indicates whether the page depends upon a successful transmission of an earlier page in the page queue;
   a controller configured to, upon initiation of a paging event, attempt transmission of each of the plurality of pages in the page queue based on the given sequence, and determine whether transmission of each of the plurality of pages was successful; and
   a memory for storing a transmission record indicating whether each attempted page from the page queue has been successfully transmitted,
   wherein the controller is further configured to, prior to attempting transmission of each page in the page queue, determine whether the page is dependent upon a successful transmission of an earlier page in the page queue, and not to attempt transmission of the page if the page is dependent upon the successful transmission of an earlier page and the transmission record indicates that transmission of the earlier page was unsuccessful.

15. The system of claim 14 wherein each of the user interface, the memory, and the controller are located in a single paging console.

16. The system of claim 14 wherein each of the plurality of pages, independent of each other page, may be a tone page or a system page.

17. The system of claim 14 wherein the controller is capable of transmitting the plurality of pages in a sequential paging mode.

18. The system of claim 14 wherein the controller is capable of transmitting the plurality of pages in a simultaneous paging mode.

19. The system of claim 14 wherein the controller is configure to, prior to attempting to transmit any page in the page queue, determine whether the page is dependent upon a successful transmission of an earlier page on a same resource, and not to attempt transmission of the page if the page is dependent upon the successful transmission of an earlier page on the same resource and the transmission record indicates that transmission of the earlier page was unsuccessful.

* * * * *

UNITED STATES PATENT AND TRADEMARK OFFICE
CERTIFICATE OF CORRECTION

| | | |
|---|---|---|
| PATENT NO. | : 8,060,120 B2 | Page 1 of 1 |
| APPLICATION NO. | : 11/619238 | |
| DATED | : November 15, 2011 | |
| INVENTOR(S) | : Lohrbach | |

It is certified that error appears in the above-identified patent and that said Letters Patent is hereby corrected as shown below:

On the Title Page, Item (56), under "U.S. PATENT DOCUMENTS", Line 9, delete "Chatterjee et al." and insert -- Chatterjee et al. ...... 455.414.1 --, therefor.

Signed and Sealed this
Eleventh Day of December, 2012

David J. Kappos
*Director of the United States Patent and Trademark Office*